United States Patent
Qian et al.

(10) Patent No.: US 10,934,371 B2
(45) Date of Patent: Mar. 2, 2021

(54) METHOD OF STEAM STRIPPING DISPERSION OF ORGANIC EXTENDER PARTICLES

(71) Applicants: Dow Global Technologies LLC, Midland, MI (US); Rohm and Haas Company, Collegeville, PA (US)

(72) Inventors: Zhen Qian, Anhui (CN); Jianming Xu, Shanghai (CN); Alvin M. Maurice, Lansdale, PA (US); Daoshu Lin, Shanghai (CN); Yaguang Zhao, Shanghai (CN); Jiayuan Yang, Shanghai (CN); Han Lv, Shanghai (CN)

(73) Assignees: Dow Global Technologies LLC, Midland (ML); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 16/348,623

(22) PCT Filed: Dec. 22, 2016

(86) PCT No.: PCT/CN2016/111435
§ 371 (c)(1),
(2) Date: May 9, 2019

(87) PCT Pub. No.: WO2018/112821
PCT Pub. Date: Jun. 28, 2018

(65) Prior Publication Data
US 2019/0309101 A1 Oct. 10, 2019

(51) Int. Cl.
| | | |
|---|---|---|
| C08F 6/16 | (2006.01) | |
| B01D 3/10 | (2006.01) | |
| B01D 3/38 | (2006.01) | |
| B01D 19/00 | (2006.01) | |
| B01D 3/34 | (2006.01) | |
| C08F 6/00 | (2006.01) | |

(52) U.S. Cl.
CPC .............. *C08F 6/16* (2013.01); *B01D 3/10* (2013.01); *B01D 3/346* (2013.01); *B01D 3/38* (2013.01); *B01D 19/0005* (2013.01); *B01D 19/0036* (2013.01); *C08F 6/003* (2013.01)

(58) Field of Classification Search
CPC .............. B01D 3/38; C08F 6/16; C08F 6/003
See application file for complete search history.

(56) References Cited

U.S. PATENT DOCUMENTS

| | | |
|---|---|---|
| 4,427,836 A | 1/1984 | Kowalski et al. |
| 4,468,498 A | 8/1984 | Kowalski et al. |
| 4,469,825 A | 9/1984 | Kowalski et al. |
| 4,594,363 A | 6/1986 | Blankenship et al. |
| 4,677,003 A | 6/1987 | Redlich et al. |
| 4,880,842 A | 11/1989 | Kowalski et al. |
| 4,910,229 A | 3/1990 | Okubo |
| 4,920,160 A | 4/1990 | Chip et al. |
| 4,970,241 A | 11/1990 | Kowalski et al. |
| 5,157,084 A | 10/1992 | Lee et al. |
| 5,360,827 A | 11/1994 | Toda et al. |
| 5,494,971 A | 2/1996 | Blankenship |
| 5,510,422 A | 4/1996 | Blankenship et al. |
| 6,139,961 A | 10/2000 | Blankenship et al. |
| 6,348,636 B1 | 2/2002 | Racz |
| 6,632,531 B2 | 10/2003 | Blankenship |
| 6,896,905 B2 | 5/2005 | Blankenship et al. |
| 7,745,567 B2 * | 6/2010 | Carpenter .............. B01D 5/006 528/500 |
| 8,470,910 B2 | 6/2013 | Fasano et al. |
| 2005/0176925 A1 | 8/2005 | Fujino et al. |
| 2008/0081175 A1 * | 4/2008 | Mukkamala .......... D21H 21/54 428/317.3 |
| 2008/0103289 A1 | 5/2008 | Carpenter et al. |
| 2011/0251345 A1 | 10/2011 | Ahmadnian et al. |
| 2014/0295173 A1 * | 10/2014 | Kalihari ............... D21H 19/385 428/335 |

FOREIGN PATENT DOCUMENTS

| | | |
|---|---|---|
| EP | 267726 A2 | 5/1988 |
| EP | 331421 A2 | 9/1989 |
| EP | 0650977 A1 | 3/1995 |
| EP | 915108 A1 | 5/1999 |
| EP | 1471080 A2 | 10/2004 |

OTHER PUBLICATIONS

POLYCO 3103 NP Emulsion from Dow Inc. (Year: 2020).*
OMNOVA Solutions—GenFlo 5128 (Year: 2020).*

* cited by examiner

*Primary Examiner* — Vu A Nguyen
(74) *Attorney, Agent, or Firm* — Karl E. Stauss; Cantor Colburn LLP

(57) ABSTRACT

A process of stripping a dispersion of organic extender particles with volatile organic compounds and a method of reducing volatile organic compounds.

9 Claims, No Drawings

METHOD OF STEAM STRIPPING DISPERSION OF ORGANIC EXTENDER PARTICLES

FIELD OF THE INVENTION

The present invention relates to a process of steam stripping a dispersion of organic extender particles with volatile organic compounds.

INTRODUCTION

In the field of waterborne paints, techniques have been developed to provide a hollow sphere polymer, or "opaque polymer", which has been successfully used to replace expensive titanium dioxide ($TiO_2$) pigment in the paints while still providing the desired opacity, or "hiding", of the $TiO_2$ pigment. During preparing opaque polymers, residual monomers, impurities from monomers, reaction by-products, solvents from surfactants, and/or other raw materials may contribute to volatile organic compounds ("VOCs") in the resultant opaque polymer dispersions, for example, benzene isomers and/or benzaldehyde. The coating industry is always interested in developing coating compositions without or with substantially reduced VOC content for less environmental problems. VOCs also tend to have strong odor and significantly negative impacts on indoor air quality.

Steam stripping is one of widely used approaches in removing VOCs from polymer dispersions. For example, U.S. Pat. No. 7,745,567 discloses a process for continuously stripping a polymer dispersion with volatile substances by contacting the dispersion with steam, where strippers comprise a shell and tube heat exchanger or a spiral heat exchanger. Unfortunately, steam stripping opaque polymer dispersions is not efficient in removing VOCs.

Therefore, there is a need to develop a process of stripping opaque polymer dispersions that is efficient in reducing VOCs therein, particularly aromatic VOCs.

SUMMARY OF THE INVENTION

The present invention provides a process of stripping a dispersion of core-shell organic extender particles with volatile organic compounds by mixing the dispersion of core-shell organic extender particles with a specific binder prior to steam stripping. The process of the present invention is efficient in removing VOCs, particularly aromatic VOCs such as benzene isomers and benzaldehyde.

In a first aspect, the present invention is a process of stripping a dispersion of core-shell organic extender particles with volatile organic compounds. The process comprises, providing a dispersion of core-shell organic extender particles with volatile organic compounds, which particles comprise, when dry, one or more voids;

mixing the dispersion of core-shell organic extender particles with a binder having an average particle size of from 30 nm to 400 nm to form an aqueous polymer composition; and steam stripping the aqueous polymer composition.

In a second aspect, the present invention is a method of reducing volatile organic compounds. The method comprises, providing a dispersion of core-shell organic extender particles with volatile organic compounds, which particles comprise, when dry, one or more voids;

mixing the aqueous dispersion of core-shell organic extender particles with a binder having an average particle size of from 30 nm to 400 nm to form an aqueous polymer composition; and steam stripping the aqueous polymer composition.

DETAILED DESCRIPTION OF THE INVENTION

"VOC" refers to any organic compound with a normal boiling point less than 250° C.

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" in the present invention can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(\text{calc.})} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

"Polymerized unit", also known as "structural unit", of the named monomer, refers to the remnant of the monomer after polymerization.

The dispersion of core-shell organic extender particles useful in the present invention comprises particles that comprise, when dry, one or more void. Such voided particles are often referred to in the art as "opaque polymer", which is commonly made by an emulsion polymerization process. More specifically, opaque polymer is most commonly formed via an aqueous multistage emulsion polymerization to form a core-shell polymeric particle.

The core of the organic extender particles includes, when dry, a core having at least one void capable of scattering visible light, i.e., capable of providing opacity to a composition in which it is included. One or more void in the organic extender particles, when dry, is generated, for example, by complete or partial hydrolysis and dissolution of the core polymer, by swelling of the core polymer with acid, base or nonionic organic agents with restricted subsequent collapse of the particles, and the like. The core-shell organic extender particles are preferably formed by an aqueous multistage emulsion polymerization followed by swelling with a base. Such multistage processes are disclosed in U.S. Pat. Nos. 4,427,836; 4,468,498; 4,469,825; 4,594, 363; 4,677,003; 4,910,229; 4,920,160; 4,970,241; 5,157,084; 5,494,971; 5,510,422; 6,139,961; 6,632,531; 6,896,905 and 8,470,910; as well as in European Patent Applications EP 267,726, EP 331,421 and EP 915,108.

In one embodiment, the core-shell organic extender particles are multistage polymers. The stages of the preferred multistage polymers include core stage polymer (the "core" or the "core polymer"), and shell stage polymer (the "shell" or the "shell polymer"). The core and shell may each, independently, include more than one stage. There may also be one or more intermediate stages. An intermediate stage polymer, when present, partially or fully encapsulates the core and itself is partially or fully encapsulated by the shell. The intermediate stage may be prepared by conducting an emulsion polymerization in the presence of the core. The cores of the preferred multistage polymers are emulsion polymers and may include, as polymerized units, from 5% to 100% by weight, from 20% to 60% by weight, or from 30% to 50% by weight, of at least one hydrophilic monoethylenically unsaturated monomer and from 0 to 95% by weight, of at least one monoethylenically unsaturated nonionic monomer; based on the weight of the core polymer. Cores containing at least 5% by weight, based on the total weight of the core polymer, of at least one hydrophilic monoethylenically unsaturated monomer will generally result in a suitable degree of swelling. The core polymer may be made in a single stage or step of the multistage polymerization or may be made by a plurality of steps in sequence. Suitable hydrophilic monoethylenically unsaturated monomers useful for making the core polymer may include monoethylenically unsaturated monomers containing acid-functionality such as monomers containing at least one carboxylic acid group including. Specific examples of hydrophilic monoethylenically unsaturated monomers include acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monobutyl fumarate, monomethyl itaconate and the like. Acrylic acid and methacrylic acid are preferred hydrophilic monoethylenically unsaturated monomers. Nonionic monomers herein refer to monomers that do not bear an ionic charge between pH=1-14. Suitable monoethylenically unsaturated nonionic monomers useful for making the core polymer may include, for example, (meth)alkyl or alkenyl esters of (meth)acrylic acid, such as methyl(meth)acrylate, ethyl(meth)acrylate, butyl(meth)acrylate, 2-ethylhexyl(meth)acrylate, hydroxyethyl(meth)acrylate, hydroxypropyl(meth)acrylate, benzyl (meth)acrylate, lauryl(meth)acrylate, oleyl(meth)acrylate, palmityl (meth)acrylate, stearyl(meth)acrylate, nonyl(meth) acrylate, decyl(meth)acrylate and the like; (meth)acrylonitrile; acrylamide; styrene and substituted styrene such as .alpha.-methyl styrene, p-methyl styrene, t-butyl styrene, vinyltoluene; ethylene, propylene, 1-decene; or other vinyl monomers such as vinyl acetate, vinyl butyrate, vinyl versatate and other vinyl esters, vinyl chloride, vinylidene chloride; or mixtures thereof.

The core of the organic extender particles, whether obtained by a single stage process or a process involving several stages, may have an average particle size of from 50 nanometers (nm) to 1.0 micron or from 100 nm to 300 nm, diameter in unswollen condition. If the core is obtained from a preformed or seed polymer, the seed polymer preferably has an average particle size of from 30 nm to 200 nm.

The core of the organic extender particles may also optionally contain as polymerized units, based on the total weight of the core, from 0.1% to 20% by weight or from 0.1% to 10% by weight, of multiethylenically unsaturated monomer, wherein the amount used is generally approximately directly proportional to the amount of hydrophilic monoethylenically unsaturated monomer used. Alternatively, the core polymer may contain as polymerized units, based on the total weight of the core polymer, from 0.1% to 60% by weight, of butadiene. Suitable multiethylenically unsaturated monomers may include alkylene glycol diacrylates and dimethacrylates, such as for example, ethylene glycol di(meth)acrylate, 1,1,1-trimethylol propane di(meth) acrylate, pentaerythritol trimethacrylate, divinyl benzene, vinyl (meth)acrylate; allyl(meth)acrylate, and the like.

Monomers used, as polymerized units, in forming the shell of the multistage polymer, and the relative proportions thereof in the shell should be such that it is permeable to an aqueous or gaseous volatile or fixed basic swelling agent capable of swelling the core. In the event that multiple shells are utilized the composition of the shell is taken herein as the total composition of all of the shells. Styrene is a preferred monomer. In an alternative embodiment, the shell further comprises as polymerized units, based on the weight of the shell, one or more multiethylenically unsaturated monomer. Suitable multiethylenically unsaturated monomers are those disclosed herein for optional use in preparing the core polymer. The shell may include as polymerized units, based on the weight of the shell, from 0% to 35%, from 0% to 10%, or from 0.1% to 10% by weight, of one or more monoethylenically unsaturated monomers containing acid-functionality such as those described above for use in preparing the core polymer. (Meth)acrylic acid is preferred. Preferably, the proportion of acid-functional monoethylenically unsaturated monomer in the shell polymer does not exceed one-third the proportion thereof in the core polymer. The weight ratio of the core to an intermediate stage, if present, is typically in the range of from 1:0.5 to 1:10 or in the range of from 1:1 to 1:7. The weight ratio of core to shell is typically in the range of from 1:5 to 1:20 or in the range of from 1:8 to 1:15. The amount of the shell polymer is typically such as to provide an overall size of the multistage polymer particle of from 70 nm to 4.5 microns, from 100 nm to 3.5 microns, from 200 nm to 2.0 microns, or from 300 nm to 2,000 nm, in unswollen condition (that is, before any neutralization to raise pH to about 6 or higher) whether the shell polymer is formed in a single stage or in a plurality of stages. When the hydrophilic core polymer is fully encapsulated, it does not titrate with alkali metal bases under analytical conditions of 1 hour and at room temperature. The extent of encapsulation can be determined by removing samples during the course of the shell polymerization and titrating with sodium hydroxide.

The void of the core-shell organic extender particles useful in the present invention is preferably produced by swelling the acid-containing core with an aqueous basic swellant that permeates the shell and expands the core. This expansion may involve partial merging of the outer periphery of the core into the pores of the inner periphery of the shell and also partial enlargement or bulging of the shell and the entire particle overall. When the swellant is removed by drying, the shrinkage of the core develops a microvoid, the extent of which depends on the resistance of the shell to restoration to its previous size. Suitable swelling agents for the core include, for example, ammonia, ammonium hydroxide, alkali metal hydroxides (such as sodium hydroxide), and volatile lower aliphatic amines (such as trimethylamine and triethylamine). The swelling step may occur during any of the multistage shell polymerization steps, between any of the staged polymerization steps, or at the end of the multistage polymerization process.

Commercially available organic extender particles which contain one or more void when dry may include, for example, ROPAQUE™ opaque polymers available from The Dow Chemical Company (ROPAQUE is a trademark of The Dow Chemical Company), CELOCOR opaque polymers from Arkema, HIQUE opaque polymers available from Hankuck Latices Co., Ltd., or mixtures thereof.

To efficiently remove VOCs in the dispersion of core-shell organic extender particles, the process of the present invention includes mixing the dispersion of core-shell organic extender particles with a binder to form a mixture, that is, an aqueous polymer composition, followed by steam stripping the aqueous polymer composition.

The binder useful in the present invention is an emulsion polymer that excludes the core-shell organic extender particles described above. The binder may comprise acrylic emulsion polymers, styrene emulsion polymers, or mixtures thereof. In one embodiment, the binder is an acrylic emulsion polymer. "Acrylic emulsion polymer" herein refers to an emulsion polymer comprising, as polymerized units, one or more acrylic monomers or their mixtures with other monomers including, for example, styrene or substituted styrene.

The binder useful in the present invention may comprise, as polymerized units, one or more monoethylenically unsaturated nonionic monomers. Suitable monoethylenically unsaturated nonionic monomers for making the binder include those described above for use in making the core polymer of the core-shell organic extender particles. Preferred monoethylenically unsaturated nonionic monomers for preparing the binder are selected from the group consisting of styrene, methyl (meth)acrylate, butyl (meth)acrylate, 2-ethyl acrylate, ethyl (meth)acrylate, and acrylonitrile. The binder may comprise as polymerized units, based on the dry weight of the binder, from 80% to 100% by weight, from 85% to 98% by weight, or from 90% to 85% by weight, of the monoethylenically unsaturated nonionic monomers.

The binder useful in the present invention may further comprise, as polymerized units, one or more ethylenically unsaturated monomers having one or more functional groups. The functional groups may be selected from a carbonyl, acetoacetate, alkoxysilane, ureido, amide, imide, amino, carboxyl, or phosphorous group. Examples of such functional-group-containing ethylenically unsaturated monomer may include α, β-ethylenically unsaturated carboxylic acids including an acid-bearing monomer such as methacrylic acid, acrylic acid, itaconic acid, maleic acid, or fumaric acid; or a monomer bearing an acid-forming group which yields or is subsequently convertible to, such an acid group (such as anhydride, (meth)acrylic anhydride, or maleic anhydride; vinyl phosphonic acid, allyl phosphonic acid, phosphoalkyl (meth)acrylates such as phosphoethyl (meth)acrylate, phosphopropyl (meth)acrylate, phosphobutyl (meth)acrylate, or salts thereof; 2-acrylamido-2-methyl-1-propanesulfonic acid; sodium salt of 2-acrylamido-2-methyl-1-propanesulfonic acid; ammonium salt of 2-acrylamido-2-methyl-1-propane sulfonic acid; sodium vinyl sulfonate; sodium salt of allyl ether sulfonate; and the like; diacetone acrylamide (DAAM), arylamide, methacrylamide, monosubstituted (meth)acrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide, methylacrylamidoethyl ethylene urea, 3-Methacryloxypropyltrimethoxysilane, vinyl trimethoxyl silane, or mixtures thereof. Preferred functional-group-containing ethylenically unsaturated monomer is acrylic acid, methacrylic acid, acrylamide, phosphoethyl (meth)acrylate, sodium salt of 2-acrylamido-2-methyl-1-propanesulfonic acid, or a mixture thereof. The binder may comprise as polymerized units, based on the dry weight of the binder, from 0.1% to 20% by weight, from 0.3% to 10% by weight, from 0.5% to 5% by weight, or from 1% to 3% by weight, of such functional-group-containing ethylenically unsaturated monomer.

In one embodiment, the functional-group-containing ethylenically unsaturated monomer is an acetoacetyl functional monomer represented by:

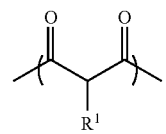

wherein $R^1$ is hydrogen, or alkyl having 1 to 10 carbon atoms, or phenyl.

Examples of acetoacetoxy functional groups are

wherein X is O, $R_1$ is a divalent radical and $R_2$ is a trivalent radical, that attach the acetoacetoxy functional group to the polymer backbone.

The acetoacetyl functional monomer useful in the present invention may be an ethylenically unsaturated acetoacetyl functional monomer. Particularly preferred ethylenically unsaturated acetoacetyl functional monomers are selected from the group consisting of acetoacetoxyethyl methacrylate ("AAEM"), acetoacetoxyethyl acrylate, acetoacetoxypropyl (meth)acrylate, allyl acetoacetate, vinyl acetoacetate, acetoacetoxybutyl (meth)acrylate, 2,3-di(acetoacetoxy)propyl (meth)acrylate, and t-butyl acetoacetate. More preferred acetoacetyl functional monomer is acetoacetoxyethyl methacrylate. The binder may comprise as polymerized units, based on the dry weight of the binder, from 0 to 20% by weight, from 0.1% to 16% by weight, from 0.5% to 10% by weight, from 1% to 8% by weight, or from 2% to 6% by weight, of the acetoacetyl functional monomer.

The types and levels of the monomers described above for preparing the binder may be chosen to provide the binder with a glass transition temperature ($T_g$) in the range of from −50° C. to 100° C., from −10° C. to 85° C., from 0° C. to 60° C., or from 10° C. to 40° C.

The binder may further comprise one or more polyfunctional carboxylic hydrazides containing at least two hydrazide groups. The polyfunctional carboxylic hydrazide may be selected from the group consisting of adipic dihydrazide, oxalic dihydrazide, isophthalic dihydrazide, and polyacrylic polyhydrazide. The concentration of the polyfunctional carboxylic hydrazide in the binder may be from 0.01% to 2% by weight or from 0.05% to 0.5% by weight, based on the weight of the binder.

The particle size of the binder useful in the present invention is critical to removal of VOCs in the dispersion of organic extender particles. The binder may have an average particle size of from 30 nm to 500 nm, from 40 nm to 300 nm, from 50 nm to 200 nm, or from 60 nm to 150 nm. The average particle size herein refers to the number average particle size as measured by Brookhaven BI-90 Particle Size Analyzer.

The dispersion of core-shell organic extender particles and the binder useful in the present invention may be prepared by emulsion polymerization of the monomers described above, respectively. Total weight concentration of the monomers for preparing the organic extender particles and the binder, respectively, is equal to 100%. A mixture of the monomers may be added neat or as an emulsion in water; or added in one or more additions or continuously, linearly or nonlinearly, over the reaction period of preparing the organic extender particles and the binder, respectively. Temperature suitable for emulsion polymerization processes may be lower than 100° C., in the range of from 30° C. to 95° C., or in the range of from 50° C. to 90° C. Multistage free-radical polymerization can also be used in preparing the binder, which at least two stages are formed sequentially, and usually results in the formation of the multistage polymer comprising at least two polymer compositions.

In the emulsion polymerization, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the emulsion polymerization, one or more surfactants may be used. The surfactant may be added prior to or during the polymerization of the monomers, or combinations thereof. A portion of the surfactant can also be added after the polymerization. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates surfactant are used. The surfactant used is usually from 0.5% to 5% by weight, preferably from 0.8% to 2% by weight, based on the weight of total monomers used for preparing the organic extender particles or the binder, respectively.

In the emulsion polymerization, a chain transfer agent may be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the organic extender particles or the binder, respectively. The chain transfer agent may be used in an amount of from 0 to 1% by weight, from 0.1% to 0.7% by weight, or from 0.2% to 0.5% by weight, based on the total weight of monomers used for preparing the binder.

After completing the emulsion polymerization, the obtained dispersion of core-shell organic extender particles and the binder may be neutralized by one or more bases as neutralizers to a pH value, respectively, for example, at least 6, from 6 to 10, or from 7 to 9. The bases may lead to partial or complete neutralization of the ionic or latently ionic groups of the organic extender particles and the binder, respectively. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof. In one embodiment, the polyfunctional carboxylic hydrazide described above is added to the obtained binder.

The obtained dispersion of core-shell organic extender particles and the binder are mixed to form the aqueous polymer composition. The dry weight (or solids weight) ratio of the binder to the dispersion of organic extender particles may be in the range of 5:95 to 95:5, from 10:90 to 90:10, from 20:80 to 80:20, from 30:70 to 70:30, from 35:65 to 65:35, from 40:60 to 60:40, or from 45:65 to 65:45. The obtained aqueous polymer composition is then subjected to steam stripping.

Process for steam stripping polymer dispersions are known in the art such as those described in U.S. Pat. No. 8,211,987B2 and U.S. Pat. No. 7,745,567B2. The steam stripping can be a continuous process or a batch process. The steam stripping can contact the steam and aqueous polymer composition in one or multiple points. Contacting of the steam and polymers can be in a co-current or counter-current mode for a continuous process. Or the steam may contact the aqueous polymer composition in a batch configuration. The batch process typically requires contacting steam from <1 hour up to 6 hours. Both continuous and batch processes are designed to eliminate VOCs in the aqueous polymer composition. In one continuous embodiment, the aqueous polymer composition contacts the steam twice in a co-current mode.

Steam stripping the aqueous polymer composition may be conducted by, feeding the aqueous polymer composition and steam into a stripper under vacuum or under atmospheric pressure;

removing at least a portion of the volatile organic compounds from the composition;

transferring the portion of the volatile organic compounds to the steam; and separating the steam from the aqueous polymer composition.

A single stripper or multiple strippers may be used in steam stripping the aqueous polymer composition. The aqueous polymer composition and steam may be contacted before the stripper(s) or in the stripper(s). They may be fed to the one or more strippers together or separately. The stripper useful in the present invention can be a single stage continuous stripper using a jacket pipe, a counter-current column, or a packed column. Preferred strippers are continuous designs where small amounts of the aqueous polymer composition contact the steam. Contact time between the aqueous polymer composition and steam in these types of strippers is short.

Prior to feeding the aqueous polymer composition to the stripper, the aqueous polymer composition may be preheated to a temperature in the range of from 30° C. to 70° C. or from 40° C. to 60° C. In one embodiment, the aqueous polymer composition is fed into the stripper at a temperature greater than the water vapor temperature for the stripper pressure.

After the stripper, the aqueous polymer composition and steam may enter a separator vessel. This vessel is used to separate the steam vapor from the liquid polymer composition. The VOCs partition between the aqueous polymer composition and the steam. The polymers in the aqueous polymer composition are pumped out of the separator vessel. The steam vapor and VOCs are then condensed in a heat exchanger or condenser and the condensate is collected in a receiver tank.

Furthermore, steam stripping may be conducted under vacuum. The pressure in the vacuum may range from 100 to 101,000 Pa (aka atmospheric pressure). The steam loading for the process can vary from 5% of the aqueous polymer composition to >100% of the aqueous polymer composition. Process variants with lower loadings of steam that affect the same amount of VOC separation are more efficient. Here loading of steam is the mass of steam required per mass of polymer composition. In a continuous process the ratio of flow rates of steam to polymer composition can be used to determine the loading.

The steam stripping process temperature may be set by the vacuum pressure of the system. The temperature may be in the range of from 20° C. to 100° C., preferably from 30° C. to 60° C. Some strippers are jacketed to minimize condensation of the steam into the polymer composition. The stripper jacket temperature is usually set higher than or equal to the temperature in the stripper to minimize these heat losses and ensures the flow of steam in and out of the process is the same. This maintains the solids level in the dispersion. Prior to steam stripping the aqueous polymer composition, the organic extender particles and the binder may be firstly each independently subject to stream stripping according to conditions described above.

The process of the present invention including steam stripping the aqueous polymer composition comprising the binder and the dispersion of core-shell organic extender particles with VOCs can provide an aromatic VOC reduction of at least 10%, at least 20%, at least 30%, or at least 40%, as compared to steam stripping the same amount of the dispersion of core-shell organic extender particles alone. Aromatic VOCs herein include benzaldehyde and benzene isomers. The reduced amount of aromatic VOCs can result in lower odor.

The present invention also relates to a method of reducing volatile organic compounds, comprising: providing the dispersion of core-shell organic extender particles with VOCs, mixing the aqueous dispersion of core-shell organic extender particles with the binder described above, thus to form an aqueous polymer composition; and steam stripping the aqueous polymer composition. The aqueous polymer composition and conditions for steam stripping are the same as described above in the process of stripping a dispersion of core-shell organic extender particles. Such method can reduce VOCs, thus also odor. For example, the method of the present invention can provide an aromatic VOC reduction of at least 10%, at least 20%, at least 30%, or at least 40%, as compared to separately steam stripping the same amount of the binder and the dispersion of organic extender particles.

EXAMPLES

Some embodiments of the invention will now be described in the following Examples, wherein all parts and percentages are by weight unless otherwise specified.

Materials used for making aqueous polymer compositions are given as follows,

Styrene ("ST"), butyl acrylate ("BA"), methacrylic acid ("MAA"), acrylamide ("AM"), methyl methacrylate ("MMA"), 2-ethylhexyl acrylate ("EHA"), acetoacetoxyethyl methacrylate ("AAEM"), and acrylic acid ("AA") are all available from The Dow Chemical Company.

Allyl Methacrylate ("ALMA") and ammonium persulfate ("APS") are both available from Sinopharm Chemical Reagent Co., Ltd.

DISPONIL LDBS 19 IS ("LDBS") surfactant, available from BASF, is sodium dodecyl (Linear) benzene sulfonate.

RHODACAL DS-4 surfactant ("DS-4"), available from Solvay, is sodium dodecyl (branched) benzene sulfonate.

DISPONIL FES 32 IS surfactant ("FES 32"), available from BASF, is sodium fatty alcohol ether sulfate.

ROPAQUE Ultra E opaque polymer ("Ultra E polymer") dispersion 1 and dispersion 2 are both available from The Dow Chemical Company.

The following process, and standard analytical equipment and methods are used in the Examples.

Steam Stripping Process

The steam stripping process used in the examples below was conducted in a single stage, continuous stripper for two cycles with polymer dispersion flow rate: 500 g/min, steam flow rate: 75 g/min, jacket temperature: 49° C., oven pressure: 6 kpa, and steam stripping tower aperture: 1 inch (2.54 cm).

VOCs Measurement

VOCs of a sample were measured by a headspace gas chromatography (GC) method. This is a gas chromatographic technique with headspace sampling of a sealed vial containing the sample. About 10-20 milligrams (mg) of a water-soluble internal standard (ethylene glycol diethyl ether (EGDEE) available from Aldrich) was weighed in the GC vial, and about 10-20 mg of sample was then added to the vial. A crimper was used to seal the cap of the vial tightly. Conditions of VOCs evaluation are as follows, Instruments: HP5890Plus or HP6890 gas chromatograph, single injector with two columns and dual FID/electrometers, and the Tekmar 7050 headspace sampling device configuration;

Data System: Data system may range from computerized systems such as HP ChemStation or PE Nelson to integrators such as HP3396;

Vials: 20 ml glass head space vials 23×75 mm (available from Varian, Inc.; Cat. No. CP10066) for the Tekmar 7050;

Closures: Teflon coated septa (diameter 20 mm) with aluminum crimp-caps (e.g., available from Varian, Inc.; Cat. No. CP10075);

Syringes: Hamilton No. 702N (25 microliter);

Crimper: a crimper with 20 mm jaws; and

Columns: Column #1: DB-WAX (30 m×0.32 mm×0.5 µm); Column #2: Rtx-200 (30 m×0.32 mm×1 µm).

Synthesis of Binder 1

A monomer emulsion was prepared by mixing 375.7 g of deionized (DI) water, 51.84 g of LDBS, 645.74 g of ST, 840.81 g of BA and 24.47 g of AA.

In a 5-liter, four necked round bottom flask equipped with a paddle stirrer, a thermometer, nitrogen inlet and a reflux condenser, 608.40 g of DI water was added and heated to 90° C. under nitrogen atmosphere with stirring. 12.11 g of LDBS, 3.82 g of $Na_2CO_3$, and 58.5 g of the monomer emulsion were then added into the flask, quickly followed by 5.35 g of sodium persulfate dissolved in 19.5 g of DI water. Upon holding the batch for 1 minute with stirring, the remaining monomer emulsion was added into the flask while co-feeding 5.35 g of sodium persulfate catalyst and 1.34 g of sodium bisulfite activator solution in 100 minutes. When the monomer emulsion feed was completed, a catalyst/activator feed (1.53 g of tert-Butyl hydroperoxide/0.47 g of iso-ascorbic acid) was added, and then another catalyst/activator feed (8.03 g of tert-Butyl hydroperoxide/2.72 g of iso-ascorbic acid) was added to the flask in 40 minutes to chase the residual monomer. Then ammonia was added to adjust pH to 7.5-8.5. The obtained polymer emulsion had an average particle size of about 150 nanometers (nm) and solids of about 50 weight percent (wt %). $T_g$ of the polymer was about 13° C.

Synthesis of Binder 2

A monomer emulsion was prepared by mixing 375.7 g of DI water, 51.84 g of LDBS, 772.16 g of MMA, 281.2 g of BA, 410.4 g of EHA, 38.0 g of MAA, and 19.76 g of AM.

In a 5-liter, four necked round bottom flask equipped with a paddle stirrer, a thermometer, nitrogen inlet and a reflux condenser, 608.40 g of DI water was added and heated to 90° C. under nitrogen atmosphere with stirring. 12.11 g of LDBS, 3.82 g of $Na_2CO_3$, and 58.5 g of the monomer emulsion were then added into the flask, quickly followed by 5.35 g of sodium persulfate dissolved in 19.5 g of DI water. Upon holding the batch for 1 minute with stirring, the remaining monomer emulsion was added into the flask while co-feeding 5.35 g of sodium persulfate catalyst and 1.34 g of sodium bisulfite activator solution in 100 minutes. When the monomer emulsion feed was completed, a catalyst/activator feed (1.53 g of tert-Butyl hydroperoxide/0.47 g of iso-ascorbic acid) was added, and then another catalyst/activator feed (8.03 g of tert-Butyl hydroperoxide/2.72 g of iso-ascorbic acid) was added to the flask in 40 minutes to chase the residual monomer. Then ammonia was added to adjust pH to 7.5-8.5. The obtained polymer emulsion had an average particle size of about 140 nm and solids of about 45 wt %. $T_g$ of the polymer was 21.8° C.

Synthesis of Binder 3

A monomer emulsion was prepared by mixing 450 g of DI water, 37.7 g of FES 32, 445.5 g of MMA, 1042.6 g of EA, 23.76 g of MAA, and 56.3 g of AAEM.

In a 5-liter, four necked round bottom flask equipped with a paddle stirrer, a thermometer, nitrogen inlet and a reflux condenser, 710 g of DI water was added and heated to 90° C. under nitrogen atmosphere with stirring. 12.11 g of LDBS, 3.82 g of $Na_2CO_3$, and 58.5 g of the monomer emulsion were then added into the flask, quickly followed by 5.35 g of sodium persulfate dissolved in 19.5 g of DI water. Upon holding the batch for 1 minute with stirring, the remaining monomer emulsion was added into the flask while co-feeding 5.35 g of sodium persulfate catalyst and 1.34 g of sodium bisulfite activator solution in 90 minutes. When the monomer emulsion feed was completed, a catalyst/activator feed (1.53 g of tert-Butyl hydroperoxide/0.47 g of iso-ascorbic acid) was added, and then another catalyst/activator feed (8.03 g of tert-Butyl hydroperoxide/2.72 g of iso-ascorbic acid) was added to the flask in 40 minutes to chase the residual monomer. Then ammonia was added to adjust pH to 7.5-8.5. The obtained polymer emulsion had an average particle size of about 140 nm and solids of about 47 wt %. $T_g$ of the polymer was about 15° C.

Synthesis of Binder 4

A monomer emulsion was prepared by mixing 380 g of DI water, 90 g of FES 32, 896.01 g of BA, 545.6 g of ST, 31.8 g of MAA, and 79 g of AAEM.

In a 5-liter, four necked round bottom flask equipped with a paddle stirrer, a thermometer, nitrogen inlet and a reflux condenser, 710 g of DI water was added and heated to 90° C. under nitrogen atmosphere with stirring. 12.11 g of LDBS, 3.82 g of $Na_2CO_3$, and 58.5 g of the monomer emulsion were then added into the flask, quickly followed by 5.35 g of sodium persulfate dissolved in 19.5 g of DI water. Upon holding the batch for 1 minute with stirring, the remaining monomer emulsion was added into the flask while co-feeding 5.35 g of sodium persulfate catalyst and 1.34 g of sodium bisulfite activator solution in 90 minutes. When the monomer emulsion feed was completed, a catalyst/activator feed (1.53 g of tert-Butyl hydroperoxide/0.47 g of iso-ascorbic acid) was added, and then another catalyst/activator feed (8.03 g of tert-Butyl hydroperoxide/2.72 g of iso-ascorbic acid) was added to the flask in 40 minutes to chase the residual monomer. Then ammonia was added to adjust pH to 7.5-8.5. The obtained polymer emulsion had an average particle size of about 140 nm and solids of about 47 wt %. $T_g$ of the polymer was about 6° C.

Synthesis of Binder 5

A monomer emulsion was prepared by mixing 270 g of DI water, 24.7 g of sodium lauryl sulfate (SLS), 1018 g of BA, and 7.2 g of ALMA.

In a 5-liter, four necked round bottom flask equipped with a paddle stirrer, a thermometer, nitrogen inlet and a reflux condenser, 793.8 g of DI water was added and heated to 90° C. under nitrogen atmosphere with stirring. 41.9 g of a preformed seed (pure acrylic binder having an average particle size of 70 nm available from The Dow Chemical Company) were then added into the flask, the remaining monomer emulsion was added into the flask while co-feeding 1.4 g of tert-Butyl hydroperoxide catalyst and 1.5 g of formaldehyde sodium sulfoxylate (SSF) solution in 90 minutes. When the monomer emulsion feed was completed, a catalyst/activator feed (1.53 g of tert-Butyl hydroperoxide/ 0.47 g of iso-ascorbic acid) was added, and then another catalyst/activator feed (8.03 g of tert-Butyl hydroperoxide/ 2.72 g of iso-ascorbic acid) was added to the flask in 40 minutes to chase the residual monomer. The obtained polymer emulsion has an average particle size of about 400 nm and solids of about 47 wt %. $T_g$ of the polymer was about −45° C.

Synthesis of Binder 6

A monomer emulsion was prepared by mixing 606 g of DI water, 22 g of DS-4, and 1645 g of MMA.

In a 5-liter, four necked round bottom flask equipped with a paddle stirrer, a thermometer, nitrogen inlet and a reflux condenser, 800 g of DI water was added and heated to 90° C. under nitrogen atmosphere with stirring. 143.78 g of Binder 5 prepared above were then added into the flask, the remaining monomer emulsion was added into the flask while co-feeding 1.7 g of APS catalyst in 90 minutes. When the monomer emulsion feed was completed, a catalyst/activator feed (1.53 g of tert-Butyl hydroperoxide/0.47 g of iso-ascorbic acid) was added, and then another catalyst/activator feed (8.03 g of tert-Butyl hydroperoxide/2.72 g of isoascorbic acid) was added to the flask in 40 minutes to chase the residual monomer. The obtained polymer emulsion has an average particle size of about 1 µm and solids of about 47 wt %. $T_g$ of the polymer was about 83° C.

Synthesis of Binder 7

A monomer emulsion was prepared by mixing 380 g of DI water, 128 g of FES 32, 512.66 g of BA, 677.24 g of MMA, 25.76 g of MAA, and 65.8 g of AAEM.

In a 5-liter, four necked round bottom flask equipped with a paddle stirrer, a thermometer, nitrogen inlet and a reflux condenser, 1250 g of DI water was added and heated to 90° C. under nitrogen atmosphere with stirring. 12.11 g of LDBS, 3.82 g of $Na_2CO_3$, and 58.5 g of the monomer emulsion were then added into the flask, quickly followed by 5.35 g of sodium persulfate dissolved in 19.5 g of DI water. Upon holding the batch for 1 minute with stirring, the remaining monomer emulsion was added into the flask while co-feeding 5.35 g of sodium persulfate catalyst and 1.34 g of sodium bisulfite activator solution in 90 minutes. When the monomer emulsion feed was completed, a catalyst/activator feed (1.53 g of tert-Butyl hydroperoxide/0.47 g of iso-ascorbic acid) was added, and then another catalyst/activator feed (8.03 g of tert-Butyl hydroperoxide/2.72 g of iso-ascorbic acid) was added to the flask in 40 minutes to chase the residual monomer. Then ammonia was added to adjust pH to 7.5-8.5. The obtained polymer emulsion had an average particle size of about 72 nm and solids of about 39 wt %. $T_g$ of the polymer was about 30° C.

Synthesis of Binder 8

In 5-liter four necked round bottom flask equipped with a paddle stirrer, a thermometer and a reflux condenser, 3 kg of Binder 7 obtained above was added. Then 9 g of adipic dihydrazide (ADH) was added into the binder slowly at room temperature. The obtained binder was stirred slowly for 1 hour and then packed it in a barrel.

Example (Ex) 1

In 5-liter four necked round bottom flask equipped with a paddle stirrer, a thermometer and a reflux condenser, Binder 1 was added. Then Ultra E polymer dispersion 1 was post added into the flask slowly at room temperature. The dry weight ratio of the binder to Ultra E polymer was 50:50. The obtained aqueous polymer composition was stirred slowly for 1 hour, packed in a barrel, and then held for 0.5 day in a 50° C. oven before steam stripping. The aqueous polymer composition was then subjected to steam stripping according to the conditions described in the stream stripping process above.

Comparative (Comp) Ex A-1

Ultra E polymer dispersion 1 was evaluated for VOCs content.

Comp Ex A-2

Ultra E polymer dispersion 1 was packed in a barrel and then held for 0.5 day in a 50° C. oven before steam stripping. Steam stripping Ultra E polymer dispersion 1 was then conducted according to the conditions described in the stream stripping process above.

Comp Ex A-3

Binder 1 and Ultra E polymer dispersion 1, respectively, were packed in barrels and then held for 0.5 day in a 50° C. oven before steam stripping. Binder 1 and Ultra E polymer dispersion were further subject to steam stripping, respectively, and then the resultant two dispersions obtained from steam stripping were mixed at a dry weight ratio of 50:50 to form an aqueous polymer composition.

Ex 2

Ex 2 was conducted according to the same procedure as described in Ex 1, except that the aqueous polymer composition was prepared by mixing Binder 2 and Ultra E polymer dispersion 1 at a dry weight ratio of 50:50, based on formulations listed in Table 1.

Comp Ex B

Comp Ex B was conducted according to the same procedure as described in Comp Ex A-3, based on formulations given in Table 1. Binder 2 and Ultra E polymer dispersion 1 were steam stripped, respectively, and the resultant two dispersions after steam stripping were mixed at a dry weight ratio of 50:50 to form an aqueous polymer composition.

Ex 3

Ex 3 was conducted according to the same procedure as described in Ex 1, except that the aqueous polymer composition was prepared by mixing Binder 3 and Ultra E polymer dispersion 2 at a dry weight ratio of 50:50, based on formulations listed in Table 2.

Comp Ex C-1

Ultra E polymer dispersion 2 was evaluated for VOCs.

Comp Ex C-2

Ultra E polymer dispersion 2 was packed in a barrel, and then held for 0.5 day in a 50° C. oven before steam stripping. Steam stripping Ultra E polymer dispersion 2 was then conducted according to conditions described in the stream stripping process above.

Comp Ex C-3

Comp Ex C-3 was conducted according to the same procedure as described in Comp Ex A-3, based on formulations given in Table 2. Binder 3 and Ultra E polymer dispersion were subjected to steam stripping, respectively, and then the resultant two dispersions after steam stripping were mixed at a dry weight ratio of 50:50 to form an aqueous polymer composition.

Ex 4

Ex 4 was conducted according to the same procedure as described in Ex 1, except that the aqueous polymer composition was prepared by mixing Binder 3 and Ultra E polymer dispersion 2 at a dry weight ratio of 10:90, based on formulations listed in Table 2.

Comp Ex D

Comp Ex D was conducted according to the same procedure as described in Comp Ex A-3, based on formulations given in Table 2. Binder 3 and Ultra E polymer dispersion were subjected to steam stripping, respectively, and then the resultant two dispersions after steam stripping were mixed at a dry weight ratio of 10:90 to form an aqueous polymer composition.

Ex 5

Ex 5 was conducted according to the same procedure as described in Ex 1, except that the aqueous polymer composition was prepared by mixing Binder 3 and Ultra E polymer dispersion 2 at a dry weight ratio of 90:10, based on formulations listed in Table 2.

Comp Ex E

Comp Ex E was conducted according to the same procedure as described in Comp Ex A-3, based on formulations given in Table 2. Binder 3 and Ultra E polymer dispersion 2 were subjected to steam stripping, respectively, and then the resultant two dispersions after steam stripping were mixed at a dry weight ratio of 90:10 to form an aqueous polymer composition.

Ex 6

Ex 6 was conducted according to the same procedure as described in Ex 1, except that the aqueous polymer composition was prepared by mixing Binder 4 and Ultra E polymer dispersion 2 at a dry weight ratio of 50:50, based on formulations listed in Table 2.

Comp Ex F

Comp Ex F was conducted according to the same procedure as described in Comp Ex A-3, based on formulations given in Table 2. Binder 4 and Ultra E polymer dispersion were subjected to steam stripping, respectively, and then the resultant two dispersions after steam stripping were mixed at a dry weight ratio of 50:50 to form an aqueous polymer composition.

Ex 7

Ex 7 was conducted according to the same procedure as described in Ex 1, except that the aqueous polymer composition was prepared by mixing Binder 5 and Ultra E polymer dispersion 2 at a dry weight ratio of 50:50, based on formulations listed in Table 2.

Comp Ex G

Comp Ex G was conducted according to the same procedure as described in Comp Ex A-3, based on formulations given in Table 2. Binder 5 and Ultra E polymer dispersion 2 were subjected to steam stripping, respectively, and then the resultant two dispersions after steam stripping were mixed at a dry weight ratio of 50:50 to form an aqueous polymer composition.

Comp Ex H-1

Comp Ex H-1 was conducted according to the same procedure as described in Comp Ex A-3, based on formulations given in Table 2. Binder 6 and Ultra E polymer dispersion 2 were subjected to steam stripping, respectively, and then the resultant two dispersions after steam stripping were mixed at a dry weight ratio of 50:50 to form an aqueous polymer composition.

Comp Ex H-2

Comp Ex H-2 was conducted according to the same procedure as described in Ex 1, except that the aqueous polymer composition was prepared by mixing Binder 6 and Ultra E polymer dispersion 2 at a dry weight ratio of 50:50, based on formulations given in Table 2.

Ex 8

In 5-liter four necked round bottom flask equipped with a paddle stirrer, a thermometer and a reflux condenser, Binder 1 was added. Then Ultra E polymer dispersion 2 was post added into the flask slowly at room temperature. The dry weight ratio of the binder to Ultra E polymer was 50:50. The obtained aqueous polymer composition was stirred slowly for 1 hour, packed in a barrel, and then subjected to steam stripping according to the conditions described in the stream stripping process above.

Comp Ex J

Binder 1 and Ultra E polymer dispersion 2 were subjected to steam stripping separately, and then the resultant two dispersions after steam stripping were mixed at a dry weight ratio of 50:50 to form an aqueous polymer composition.

Ex 9

Ex 9 was conducted according to the same procedure as described in Ex 1, except that the aqueous polymer composition was prepared by mixing Binder 7 and Ultra E polymer dispersion 2 at a weight ratio of 10:90, based on formulations listed in Table 2.

Comp Ex K

Comp Ex K was conducted according to the same procedure as described in Comp Ex A-3, based on formulations given in Table 2. Binder 7 and Ultra E polymer dispersion 2 were subjected to steam stripping, respectively, and then the resultant two dispersions after steam stripping were mixed at a dry weight ratio of 10:90 to form an aqueous polymer composition.

Ex 10

Ex 10 was conducted according to the same procedure as described in Ex 1, except that the aqueous polymer composition was prepared by mixing Binder 8 and Ultra E polymer dispersion 2 at a dry weight ratio of 10:90, based on formulations listed in Table 2.

Comp Ex L

Comp Ex L was conducted according to the same procedure as described in Comp Ex A3, based on formulations given in Table 2. Binder 8 and Ultra E polymer dispersion were subjected to steam stripping, respectively, and then the resultant two dispersions after steam stripping were mixed at a dry weight ratio of 10:90 to form an aqueous polymer composition.

VOCs of the aqueous polymer compositions obtained above were measured according to the test method described above and results are given in Tables 1 and 2.

As shown in Tables 1 and 2, VOCs in pure Ultra E polymer were difficult to be removed by steam stripping, particularly for benzene isomers and benzaldehyde. As shown in Table 1, Ultra E polymer dispersion 1 (without steam stripping) contained 20 ppm benzene isomers and 44 ppm benzaldehyde (Comp Ex A-1). VOCs in pure Ultra E polymer were difficult to be removed by steam stripping, particularly for benzene isomers and benzaldehyde. For example, two cycles of steam stripping only removed about 14% of benzaldehyde (Comp A-2). Steam stripping the aqueous polymer composition comprising Binder 1 and Ultra E polymer at a dry weight ratio of 50:50 (Ex 1) was beneficial to decrease most types of VOCs, particularly the amount of benzaldehyde and benzene isomers can be decreased to 60%-80% of those in Comp Ex A-3. In addition, steam stripping the aqueous polymer composition comprising Binder 2 and Ultra E polymer at a dry weight ratio of 50:50 (Ex 2) decreased the amount of benzaldehyde and benzene isomers to 60%-80% of those in Comp Ex B.

As shown in Table 2, Ultra E polymer dispersion 2 (without steam stripping) contained 55 ppm benzene isomers and 47 ppm benzaldehyde (Comp Ex C-1). Two cycles of steam stripping only removed about 14% of benzaldehyde (Comp Ex C-2). Steam stripping the aqueous polymer composition comprising Binder 3 (comprising polymerized units of AAEM) and Ultra E polymer at a dry weight ratio of 50:50 (Ex 3) was efficient in removing most types of VOCs, for example, the amounts of benzaldehyde and benzene isomers were decreased to 45%-70% of those in Comp Ex C-3. Steam stripping aqueous polymer compositions comprising different binders and Ultra E polymer in Exs 3-10 resulted in at least 10%-30% decrease of benzaldehyde and benzene isomers concentration as compared to compositions obtained by separately steam stripping the same type and dosage of the binder and Ultra E polymer dispersion, and mixing the resultant dispersions. In contrast, steam stripping Ultra E polymer together with the binder having an average particle size of about 1 µm (Binder 6) showed no synergy effect on decreasing VOCs (Com Ex H-2) as compared to separately steam stripping the same binder and Ultra E polymer dispersion (Comp Ex H-1).

In summary, steam stripping mixtures of Ultra E polymer and specific binders above can improve the efficiency of reducing aromatic VOCs with higher boiling points (e.g., benzaldehyde and benzene isomers, etc.), which were difficult to be removed by steam stripping Ultra E polymer dispersion alone (Comp Exs A-3 and C-3).

TABLE 1

| Sample ID | Binder/Ultra E polymer (dry weight ratio of Binder/Ultra E polymer) | Aromatic VOCs (ppm) (headspace test method) | |
| --- | --- | --- | --- |
| | | Benzene isomers | Benzaldehyde |
| Comp Ex A-1 | Ultra E polymer dispersion 1 (without steam stripping) | 20 | 44 |
| Comp Ex A-2 | Ultra E polymer dispersion 1 (with steam stripping) | 24 | 37 |
| Comp Ex A-3 | Steam stripped Binder 1 plus steam stripped Ultra E (50:50) | 18 | 34 |
| Ex 1 | Steam stripped mixture of [Binder 1 + Ultra E (50:50)] | 13 | 22 |
| Comp Ex B | Steam stripped Binder 2 plus steam stripped Ultra E (50:50) | 12 | 22 |
| Ex 2 | Steam stripped mixture of [Binder 2 + Ultra E (50:50)] | 8 | 14 |

* Ultra E polymer dispersion 1 (without steam stripping) used in examples listed in table 1 contained 20 ppm benzene isomers and 44 ppm benzaldehyde.

TABLE 2

| | Binder/Ultra E polymer (dry weight ratio of Binder/Ultra E polymer) | Aromatic VOCs (ppm) (head space test method) | |
| --- | --- | --- | --- |
| | | Benzene isomers | Benzaldehyde |
| Comp Ex C-1 | Ultra E polymer dispersion 2 (without steam stripping) | 55 | 47 |
| Comp Ex C-2 | Ultra E polymer dispersion 2 (with steam stripping) | 58 | 40 |
| Comp Ex C-3 | Steam stripped Binder 3 plus steam stripped Ultra E (50:50) | 29 | 20 |
| Ex 3 | Steam stripped mixture of [Binder 3 + Ultra E (50:50)] | 21 | 9 |
| Comp Ex D | Steam stripped Binder 3 plus steam stripped Ultra E (10:90) | 52 | 36 |
| Ex 4 | Steam stripped mixture of [Binder 3 + Ultra E (10:90)] | 47 | 28 |
| Comp Ex E | Steam stripped Binder 3 plus steam stripped Ultra E (90:10) | 6 | 4 |
| Ex 5 | Steam stripped mixture of [Binder 3 + Ultra E (90:10)] | 7 | 0 |
| Comp Ex F | Steam stripped Binder 4 plus steam stripped Ultra E (50:50) | 33 | 20 |
| Ex 6 | Steam stripped mixture of [Binder 4 + Ultra E (50:50)] | 31 | 10 |
| Comp Ex G | Steam stripped Binder 5 plus steam stripped Ultra E (50:50) | 29 | 20 |
| Ex 7 | Steam stripped mixture of [Binder 5 + Ultra E (50:50)] | 24 | 17 |
| Comp Ex H-1 | Steam stripped Binder 6 plus steam stripped Ultra E (50:50) | 29 | 20 |
| Comp Ex H-2 | Steam stripped mixture of [Binder 6 + Ultra E (50:50)] | 35 | 24 |
| Comp Ex J | Steam stripped Binder 1 plus steam stripped Ultra E (50:50) | 35 | 35 |
| Ex 8 | Steam stripped mixture of [Binder 1 + Ultra E (50:50)] | 33 | 25 |
| Comp Ex K | Steam stripped Binder 7 plus steam stripped Ultra E (10:90) | 52 | 36 |
| Ex 9 | Steam stripped mixture of [Binder 7 + Ultra E (10:90)] | 45 | 34 |
| Comp Ex L | Steam stripped Binder 8 plus steam stripped Ultra E (10:90) | 52 | 36 |
| Ex 10 | Steam stripped mixture of [Binder 8 + Ultra E (10:90)] | 41 | 29 |

* Ultra E polymer dispersion 2 (without steam stripping) used in examples listed in table 2 contained 55 ppm benzene isomers and 47 ppm benzaldehyde.

What is claimed is:

1. A process of stripping a dispersion of core-shell organic extender particles with volatile organic compounds, comprising:
   providing a dispersion of core-shell organic extender particles with volatile organic compounds, which particles comprise, when dry, one or more voids;
   mixing the dispersion of core-shell organic extender particles with a binder comprising, as polymerized units, an acetoacetyl functional monomer, and having an average particle size of from 30 nm to 400 nm to form an aqueous polymer composition; and
   steam stripping the aqueous polymer composition.

2. The process of claim 1, wherein the dry weight ratio of the binder to the dispersion of core-shell organic extender particles is in the range of 5:95 to 90:10.

3. The process of claim 1, wherein the binder has an average particle size of from 30 nm to 200 nm.

4. The process of claim 1, wherein the binder further comprises adipic dihydrazide, oxalic dihydrazide, isophthalic dihydrazide, polyacrylic polyhydrazide, or mixtures thereof.

5. The process of claim 1, wherein the binder is an acrylic emulsion polymer.

6. The process of claim 1, wherein the binder has a glass transition temperature of from −50° C. to 100° C.

7. The process of claim 1, wherein the core-shell organic extender particles comprises polymerized units of styrene in the shell.

8. The process of claim 1, wherein steam stripping is a continuous or batch process.

9. The process of claim 1, wherein steam stripping the aqueous polymer composition is conducted by
   feeding the aqueous polymer composition and steam into a stripper under vacuum or under atmospheric pressure;
   removing at least a portion of the volatile organic compounds from the aqueous polymer composition;
   transferring the portion of the volatile organic compounds to the steam; and
   separating the steam from the aqueous polymer composition.

* * * * *